United States Patent
Naito et al.

(10) Patent No.: US 10,094,731 B2
(45) Date of Patent: Oct. 9, 2018

(54) STANDING POSITION EVALUATION APPARATUS, STANDING POSITION EVALUATION METHOD, AND NON-TRANSITORY COMPUTER READABLE MEDIUM

(71) Applicant: FUJI XEROX CO., LTD., Tokyo (JP)

(72) Inventors: Takao Naito, Kanagawa (JP); Osamu Tochikubo, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 157 days.

(21) Appl. No.: 15/073,711

(22) Filed: Mar. 18, 2016

(65) Prior Publication Data

US 2016/0282215 A1 Sep. 29, 2016

(30) Foreign Application Priority Data

Mar. 24, 2015 (JP) .................................. 2015-061332
Dec. 28, 2015 (JP) .................................. 2015-255875

(51) Int. Cl.
*G01M 1/00* (2006.01)
*G01M 1/12* (2006.01)

(52) U.S. Cl.
CPC .................................. *G01M 1/122* (2013.01)

(58) Field of Classification Search
None
See application file for complete search history.

(56) References Cited

U.S. PATENT DOCUMENTS

| | | | | |
|---|---|---|---|---|
| 5,919,149 A * | 7/1999 | Allum | ................... | A61B 5/1116 600/595 |
| 6,063,046 A * | 5/2000 | Allum | .................. | A61B 5/1036 600/595 |
| 7,031,872 B2 * | 4/2006 | Tanaka | ................... | A61B 5/103 324/160 |
| 8,727,785 B2 * | 5/2014 | Oddsson | .............. | A61H 1/0229 434/247 |
| 8,878,922 B2 * | 11/2014 | Anabuki | ................ | H04N 7/144 348/77 |
| 9,149,222 B1 * | 10/2015 | Zets | ......................... | A61B 5/16 |
| 9,414,781 B2 * | 8/2016 | Zheng et al. | ......... | G01M 1/122 73/65.01 |
| 9,510,798 B2 * | 12/2016 | Mao | ..................... | A61B 6/4441 |

(Continued)

FOREIGN PATENT DOCUMENTS

JP 2010-504123 A 2/2010
JP 2012-11136 A 1/2012

(Continued)

*Primary Examiner* — Peter Macchiarolo
*Assistant Examiner* — Jermaine Jenkins
(74) *Attorney, Agent, or Firm* — Sughrue Mion, PLLC

(57) ABSTRACT

A standing position evaluation apparatus includes a center-of-gravity position detection unit that detects a head-center-of-gravity position that is a position of a center of gravity of a head of a subject in a standing position projected onto a floor surface and a body-center-of-gravity position that is a position of a center of gravity of a body of the subject in the standing position projected onto the floor surface, and an evaluation unit that evaluates a standing position balance of the subject by using the detected head-center-of-gravity position and the detected body-center-of-gravity position.

18 Claims, 16 Drawing Sheets

(56) References Cited

U.S. PATENT DOCUMENTS 9,526,946 B1* 12/2016 Zets ................ A63B 24/00
2016/0278683 A1* 9/2016 Naito ............... A61B 5/4023

FOREIGN PATENT DOCUMENTS

| JP | 2012-176170 A | 9/2012 |
| JP | 2014-204759 A | 10/2014 |
| WO | 2008/034965 A1 | 3/2008 |

* cited by examiner

STANDING POSITION EVALUATION APPARATUS, STANDING POSITION EVALUATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-061332 filed Mar. 24, 2015, and Japanese Patent Application No. 2015-255875 filed Dec. 28, 2015.

BACKGROUND (i) Technical Field

The present invention relates to a standing position evaluation apparatus, a standing position evaluation method, and a non-transitory computer readable medium.

(ii) Related Art

Due to an increase in the proportion of older people in society, prevention and early detection of metabolic syndrome (syndrome due to excessive visceral fat), locomotive syndrome (syndrome related to locomotive systems), and dementia, which are major causes of a decrease in healthy lifespan and an increase in the population in need of nursing care, are serious issues. Here, the term "locomotive syndrome" generally refers to physical conditions that are likely to make a person bedridden or in need of nursing care due to disorders of the locomotive systems, such as a decrease in balancing ability, a decrease in physical power, a decrease in mobility, or an increased risk of accidental fall.

The standing position is maintained by complex coordination between muscles, bones, nerves, and the brain; and it is considered that balance is maintained by sophisticated functions of the brain. It is also considered that the degree of locomotive syndrome or dementia or the degree of fatigue influence standing position balance, which reflects the relationships between indicators of the positions of the head and the body. Accordingly, by examining balance including the relationships between indicators of the positions of the head and the body in the standing position (hereinafter, referred to as the "standing position balance"), it is possible to objectively evaluate, for example, the degree of locomotive syndrome or dementia or the degree of fatigue.

It is possible to determine standing position balance by, for example, determining whether the indicators of the positions of the head, the body, and other parts of a subject in a standing position are substantially aligned in a straight line (while considering variations among individuals). However, it is not possible to evaluate standing position balance by using general existing technologies, because the existing technologies evaluate only the balance of pressures on the soles of the feet of a subject without examining the relationship between the indicators of the positions of the head and the body.

SUMMARY

According to an aspect of the invention, a standing position evaluation apparatus includes a center-of-gravity position detection unit that detects a head-center-of-gravity position that is a position of a center of gravity of a head of a subject in a standing position projected onto a floor surface and a body-center-of-gravity position that is a position of a center of gravity of a body of the subject in the standing position projected onto the floor surface, and an evaluation unit that evaluates a standing position balance of the subject by using the detected head-center-of-gravity position and the detected body-center-of-gravity position.

BRIEF DESCRIPTION OF THE DRAWINGS

An exemplary embodiment of the present invention will be described in detail based on the following figures, wherein.

DETAILED DESCRIPTION

Figure 1:
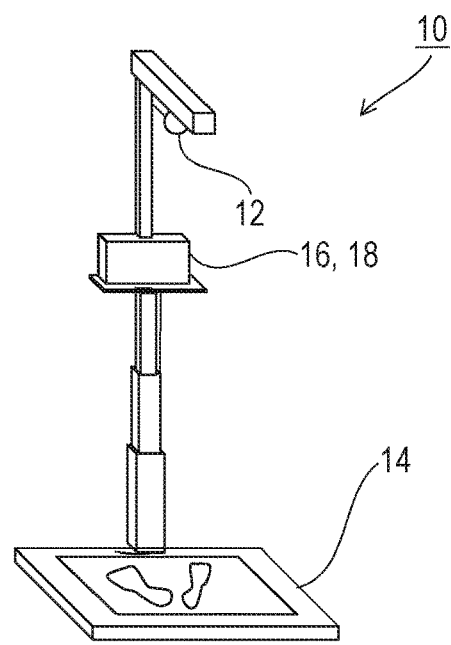
FIG. 1 is an external view of a standing position evaluation apparatus according to the exemplary embodiment.

Hereinafter, an exemplary embodiment of the present invention will be described with reference to the drawings.

First, the fundamental principle of the present exemplary embodiment will be described.

Fundamental Principle

The present exemplary embodiment is based on the following fundamental principle. It is assumed that it is possible to determine standing position balance according to whether or not indicators of the positions of body segments, such as the head and the trunk, are substantially aligned in a straight line. Standing position balance is evaluated by detecting the center of gravity of the head and the center of gravity of the body (trunk) and by evaluating the relationship between the center of gravity of the head and the center of gravity of the body, to be more specific, the relationship between positions obtained by projecting the center of gravity of the head and the center of gravity of the body onto a floor surface. If the positions obtained by projecting the center of gravity of the head and the center of gravity of the body onto the floor surface substantially coincide, standing position balance is considered good or standing position balance is considered normal. If the positions obtained by projecting the center of gravity of the head and the center of gravity of the body onto the floor surface differ from each other beyond an acceptable range, standing position balance is considered bad or standing position balance is considered abnormal. Here, the phrase "substantially coincide" is used to mean that the difference between the positions is within an acceptable range with consideration given to variations among individuals and statistical errors.

It is possible to detect a head-center-of-gravity position (the position of the center of gravity of the head projected onto the floor surface) from, for example, an image obtained by capturing a subject in a standing position by using an overhead camera. It is possible to detect a body-center-of-gravity position (the position of the center of gravity of the body projected onto the floor surface) from, for example, a signal from a body pressure sensor on which the subject stands in a standing position. The head-center-of-gravity position is the position of the center of gravity of only the head, and the body-center-of-gravity position is the position of the center of gravity of the entire body, including the head.

If the two center-of-gravity positions coincide, it is possible to evaluate that the center of gravity of the head and the center of gravity of the body are substantially in a vertical straight line and that standing position balance is maintained. If the two center-of-gravity positions are displaced from each other, it is possible to quantitatively evaluate the degree to which standing position balance is bad by using the magnitude of the displacement or the change of the displacement with time. Instead of using only the center of gravity of a body, both the head-center-of-gravity position and the body-center-of-gravity position are used in the present exemplary embodiment, and standing position balance is evaluated by examining the relationship between the body-center-of-gravity position and the head-center-of-gravity position.

In the present exemplary embodiment, impairment of standing position balance is considered to reflect impairment of balance adjusting ability of the brain, and a possibility of locomotive syndrome or dementia or the degree of fatigue is evaluated by evaluating standing position balance.

It may be possible to detect locomotive syndrome, dementia, and the like by periodic medical examinations, thorough medical examinations, and the like at medical institutions. However, it is desirable to evaluate a possibility of locomotive syndrome, dementia, and the like by (routinely) performing an examination by using a simpler apparatus. The present exemplary embodiment realizes this by using a simple structure including a camera, a body pressure sensor, and a control device.

Needless to say, locomotive syndrome, dementia, and fatigue are disorders that differ from each other in a strict sense. However, in the present exemplary embodiment, it is assumed that impairment of standing position balance is a common early symptom of these conditions, and evaluation of standing position balance is performed in a simple and visible way.

Next, the present exemplary embodiment will be described in detail. Note that the structure described below is an example, and the present invention is not limited to the details of the structure.

Fundamental Structure

FIG. 1 is an external view of a standing position evaluation apparatus 10. The shape of the standing position evaluation apparatus 10 is similar to that of an apparatus for measuring the height and weight of a subject, who is standing on a base plate in a standing position. The standing position evaluation apparatus 10 includes an overhead 3D camera 12, a body pressure sensor 14, and a control device 16 including a display 18.

The overhead 3D camera 12 is attached to a supporting member, which extends in a horizontal direction from an upper part of a supporting column of the standing position evaluation apparatus 10, so as to face downward. The overhead 3D camera 12 is attached to the supporting member so that, when a subject is standing with his/her feet placed at predetermined positions on the body pressure sensor 14 of the standing position evaluation apparatus 10, the overhead 3D camera is positioned substantially directly above the head of the subject. The overhead 3D camera 12 captures an image of the subject from above the head of the subject, and outputs image data obtained by capturing the image to the control device 16. The supporting member may be movable up and down along the supporting column so that the distance between the head of the subject and the overhead 3D camera 12 is adjustable in accordance with the height of the subject.

In general, a 3D camera, which is used to capture 3D contents to be displayed on a 3D display, includes two cameras for capturing an image for the right eye and an image for the left eye. The two cameras are disposed at positions that are horizontally separated from each other by a distance of 50 mm or smaller so as to approximately correspond to the positions of human eyes. The 3D camera may include two cameras that are integrated, may include two camera units each including a lens and an imaging element, or may include lenses for the right eye and the left eye and a single imaging element. In the last case, the imaging element is divided into two regions, one for the right eye lens and the other for the left eye lens, and simultaneously captures images for both eyes. In the present exemplary embodiment, the overhead 3D camera 12 is particularly used to measure the distances between the overhead 3D camera 12 and parts of the head of a subject.

The body pressure sensor 14, which is disposed on the base plate of the standing position evaluation apparatus 10, detects the body pressure of a subject. The body pressure sensor 14 has footprint marks, and the subject places his/her feet on the body pressure sensor 14 by using the footprint marks as reference marks. The relationship between the position of the overhead 3D camera 12 and the position of the body pressure sensor 14, to be specific, the relationship between the position of the overhead 3D camera and the positions of the footprint marks of the body pressure sensor 14 is set so that the 3D camera 12 is located above the head of a subject when the subject stands on the base plate with his/her feet on the footprint marks. It is not necessary that the overhead 3D camera 12 be located directly above the head of the subject. It is only necessary that the head of the subject be within the range of the angle of view of the overhead 3D camera 12. The body pressure sensor 14 detects the body pressure when the subject is in a standing position with his/her feet on the body pressure sensor 14, and outputs body pressure data to the control device 16.

The body pressure sensor 14 is a pressure sensor, such as a piezoelectric element. The body pressure sensor 14 converts a pressure (load), which is generated when the subject places his/her feet on the body pressure sensor 14, into an electric signal and outputs the electric signal. The body pressure sensor 14 may be disposed in the entire region of each of the footprint marks or at specific positions of the footprint marks. For example, pressure sensors may be disposed at three positions, which are a position near the base of the thumb, a position near the base of the little finger, and a position near the base of the ankle of each foot (six positions for the left and right feet). The body pressure sensor 14 may be disposed at any appropriate position, as long as the body pressure sensor 14 is capable of detecting the body pressure (load), which is used to calculate the position of the center of gravity of the body of a subject.

The control device 16 includes a processor, a memory, an I/O interface, and the display 18. The control device 16 receives image data obtained by the overhead 3D camera 12, and calculates a head-center-of-gravity position $g_{head}$ of the subject from the image data. To be more precise, the control device 16 calculates the position of the center of gravity of the head projected onto a floor surface (on which the feet of a subject are placed). The control device 16 also receives body pressure data obtained by the body pressure sensor 14, and calculates a body-center-of-gravity position $g_{fp}$ of the subject from the body pressure data. To be more precise, the control device 16 calculates the position of the center of gravity of the body projected onto the floor surface (on which the feet are placed). There are known technologies for calculating the body-center-of-gravity position of a person standing on a pressure sensor. For example, pressure sensors may be disposed at three positions, which are a position near the base of the thumb, a position near the base of the little finger, and a position near the base of the ankle of each foot (six positions for the left and right feet). In this case, the pressure distribution is calculated by processing electric signals from the six pressure sensors, and it is determined that the center of the pressure distribution is the body-center-of-gravity position. The control device 16 evaluates standing position balance of the subject on the basis of the head-center-of-gravity position $g_{head}$ and the body-center-of-gravity position $g_{fp}$, and displays the result of the evaluation on the display 18.

The display 18 is disposed so as to face the face of the subject so that the subject may easily see the evaluation result when the subject is on the body pressure sensor 14 in a standing position.

The control device 16 may be a small computer or a tablet terminal including the display 18. The display 18 may be a touch panel so that the subject may easily operate the control device 16.

Figure 2A:
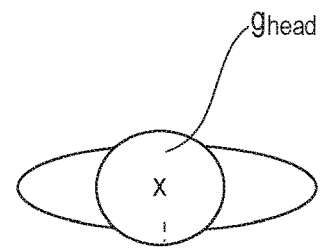
FIGS. 2A and 2B are diagrams illustrating the relationship between a head-center-of-gravity position and a body-center-of-gravity position according to the exemplary embodiment.
Figure 2B:
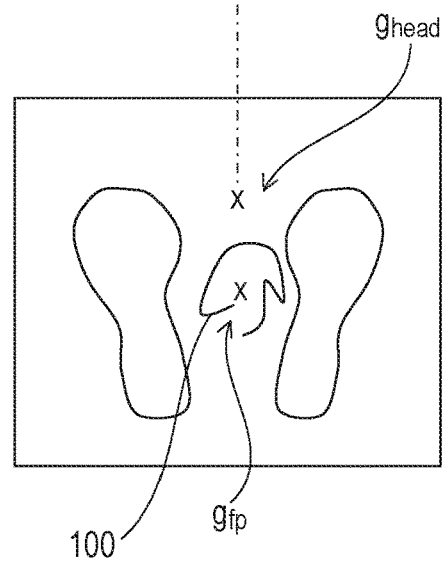

FIGS. 2A and 2B illustrate the relationship between the head-center-of-gravity position $g_{head}$, which is calculated from image data obtained by the overhead 3D camera 12, and the body-center-of-gravity position $g_{fp}$, which is calculated from body pressure data obtained by the body pressure sensor 14. FIG. 2A is a top view of a subject, also showing the head-center-of-gravity position $g_{head}$. FIG. 2B a top view of a floor surface (on which the feet of the subject are placed), also showing the head-center-of-gravity position $g_{head}$ and the body-center-of-gravity position $g_{fp}$.

Figure 3:
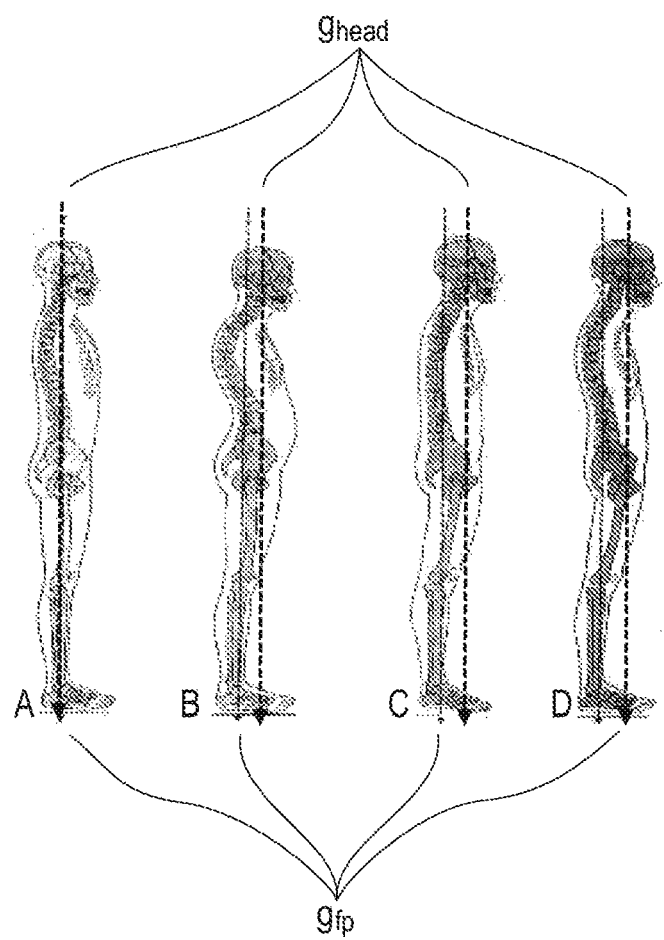
FIG. 3 is another diagram illustrating the relationship between the head-center-of-gravity position and the body-center-of-gravity position according to the exemplary embodiment.

FIG. 3 shows the distances between the head-center-of-gravity position $g_{head}$ and the body-center-of-gravity position $g_{fp}$ for various standing positions. In a correct standing position (standing position in a healthy state), the head-center-of-gravity position $g_{head}$ and body-center-of-gravity position $g_{fp}$ substantially coincide. On the other hand, as standing position balance becomes lost due to locomotive syndrome, dementia, fatigue, or the like, the distance between the head-center-of-gravity position $g_{head}$ and the body-center-of-gravity position $g_{fp}$ tends to increase gradually. (In reality, there may be a case where standing position balance is impaired due to a cause other than locomotive syndrome or dementia. However, in the present exemplary embodiment, it is assumed that, also in such a case, there is a possibility of locomotive syndrome in a broader sense.)

When a subject is in a standing position, the body of the subject may constantly move slightly or may swing considerably, so that the body-center-of-gravity position $g_{fp}$ may vary with time. Therefore, as illustrated in FIG. 2, the body-center-of-gravity position $g_{fp}$ draws a Lissajous FIG. 100. Likewise, the head-center-of-gravity position $g_{head}$ draws a Lissajous figure (not shown).

The control device 16 comprehensively evaluates the standing position balance of the subject on the basis of the distance between the head-center-of-gravity position $g_{head}$ and the body-center-of-gravity position $g_{fp}$ and the results of analyzing the Lissajous figures of the center-of-gravity positions.

Figure 4:
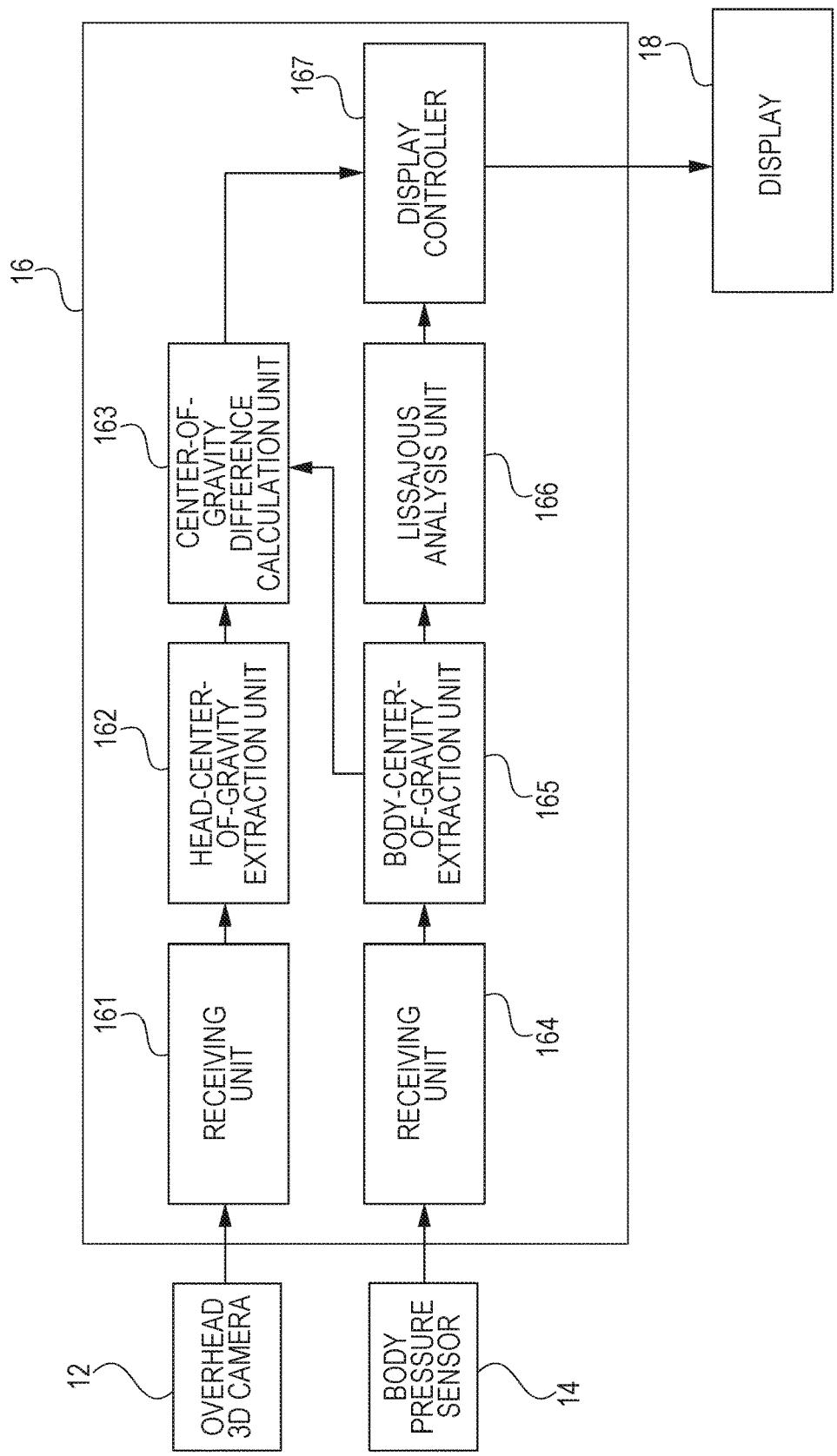
FIG. 4 is a block diagram according to the exemplary embodiment.

FIG. 4 is a block diagram of the standing position evaluation apparatus 10. As described above, the standing position evaluation apparatus 10 includes the overhead 3D camera 12, the body pressure sensor 14, the control device 16, and the display 18. The control device 16 includes functional blocks, which are receiving units 161 and 164, a head-center-of-gravity extraction unit 162, a body-center-of-gravity extraction unit 165, a center-of-gravity difference calculation unit 163, a Lissajous analysis unit 166, and a display controller 167.

The receiving unit 161 receives image data from the overhead 3D camera 12 and outputs the image data to the head-center-of-gravity extraction unit 162.

The receiving unit 164 receives body pressure data from the body pressure sensor 14 and outputs the body pressure data to the body-center-of-gravity extraction unit 165.

The head-center-of-gravity extraction unit 162 calculates the head-center-of-gravity position $g_{head}$ (the position of the head projected onto the floor surface) of the subject by using the image data. To be specific, the head-center-of-gravity extraction unit 162 detects a part of the head that is nearest in distance (the shortest distance) from the input image data, and calculates the head-center-of-gravity position $g_{head}$ as the center of an area within a depth Δd from the shortest distance portion (where Δd is a predetermined distance of, for example, 10 cm). The head-center-of-gravity extraction unit 162 outputs the calculated head-center-of-gravity position $g_{head}$ to the center-of-gravity difference calculation unit 163.

The body-center-of-gravity extraction unit 165 calculates the body-center-of-gravity position $g_{fp}$ (the position of the body projected onto the floor surface) by using the body pressure data. To be specific, the body-center-of-gravity extraction unit 165 calculates the body-center-of-gravity position $g_{fp}$ as the center position of the distribution of the detected body pressure. The body-center-of-gravity extraction unit 165 outputs the calculated body-center-of-gravity position $g_{fp}$ to the center-of-gravity difference calculation unit 163 and the Lissajous analysis unit 166.

The center-of-gravity difference calculation unit 163 detects the distance between the head-center-of-gravity position $g_{head}$ and the body-center-of-gravity position $g_{fp}$, and outputs the distance to the display controller 167.

The Lissajous analysis unit 166 analyzes the Lissajous FIG. 100 of the body-center-of-gravity position $g_{fp}$ and outputs the result of the analysis to the display controller 167. The Lissajous analysis unit 166 may also analyze the Lissajous figure of the head-center-of-gravity position $g_{head}$ in the same way.

The display controller 167 displays the calculated distance between the center-of-gravity positions and the result of the analysis of the Lissajous figure on the display 18. Moreover, the display controller 167 evaluates standing position balance by comparing the calculated distance between the center-of-gravity positions with a threshold and by comparing the result of the analysis of the Lissajous figure with a threshold. The display controller 167 displays the evaluation result, that is, a possibility of locomotive syndrome, dementia, or the like on the display 18. It is possible for the subject to check his/her standing position balance by seeing the analysis results displayed on the display 18. Moreover, it is possible for the subject to have training so as to adjust his/her center-of-gravity position to a correct position, which is visible on the display 18. For example, if the head center-of-gravity position is slightly in front of the body center-of-gravity position, the subject may straighten up his/her back so as to make these positions coincide. The display modes may be set in any appropriate way. For example, nothing may be displaced if the evaluation result is normal, and only a possibility of locomotive syndrome or the like may be displayed if there is any. For another example, the evaluation result may be displayed regardless of whether the evaluation result is normal or there is a possibility of locomotive syndrome or the like. The display controller 167 may be functionally divided into a determination unit and a display control unit. In this case, the determination unit may evaluate standing position balance by comparing the distance between the center-of-gravity positions with a threshold and by comparing the result of the analysis of the Lissajous figure with a threshold; and may output the evaluation result to the display control unit.

Referring to FIG. 4, the head-center-of-gravity extraction unit 162, the body-center-of-gravity extraction unit 165, the center-of-gravity difference calculation unit 163, the Lissajous analysis unit 166, and the display controller 167 may be implemented in a processor. The processor reads programs stored in a program memory, such as a flash ROM, and performs various functions by successively executing the programs. Needless to say, these functions may be performed by dedicated circuits. The control device 16 may be normally in an active mode. Alternatively, the control device 16 may be normally in a stand-by mode or a sleep mode, and may be switched to an active mode when a subject places his/her feet on the body pressure sensor 14 and the body pressure sensor 14 outputs body pressure data.

Figure 5:
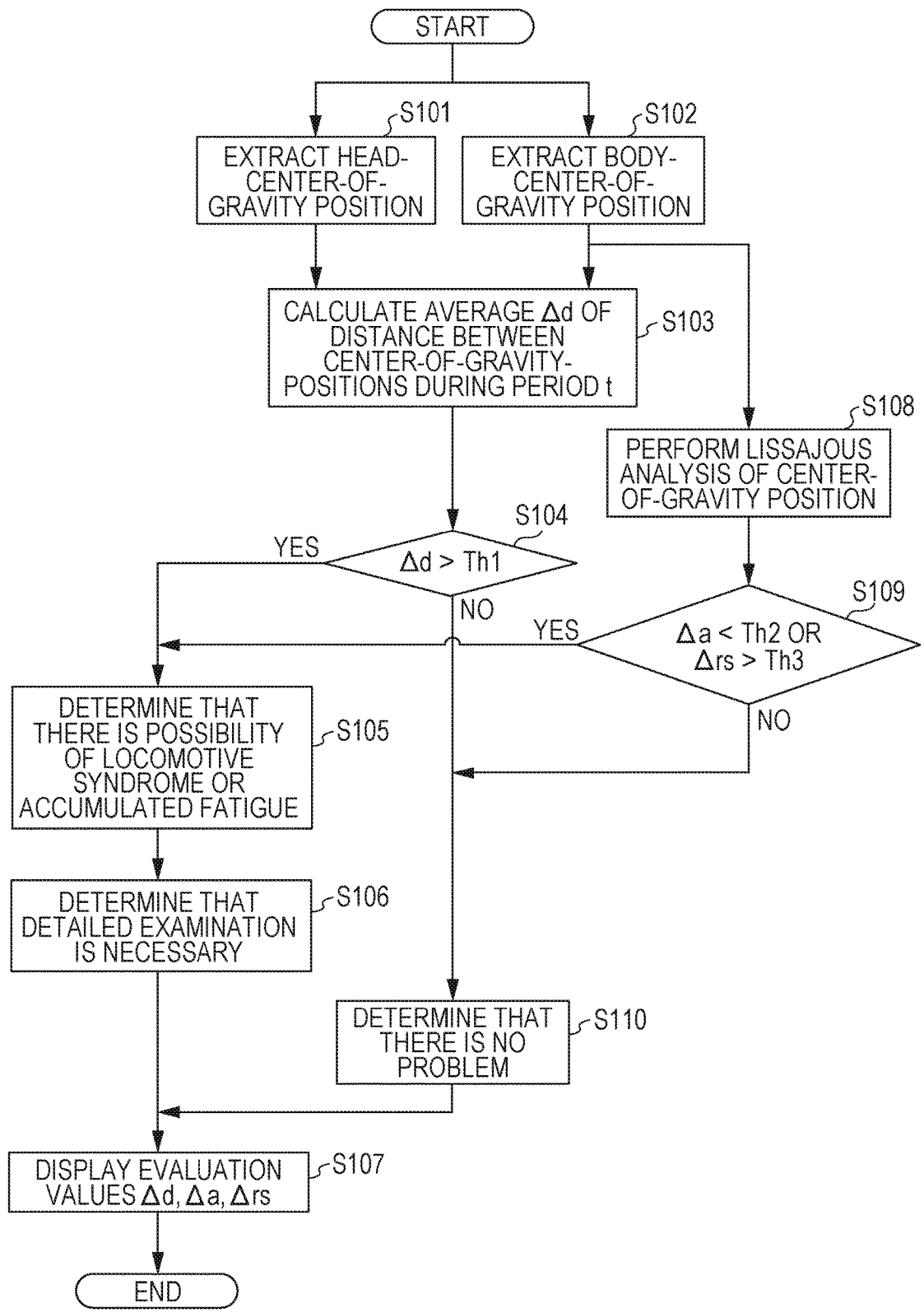
FIG. 5 is a flowchart of a process according to the exemplary embodiment.

Next, processing steps according to the present exemplary embodiment will be described in detail.
Processing Steps FIG. 5 is a flowchart of the entire process according to the present exemplary embodiment.

When a subject stands on the footprint marks of the body pressure sensor 14, the standing position evaluation apparatus 10 is activated, the overhead 3D camera 12 captures an image of the head of the subject, and the body pressure sensor 14 detects the body pressure of the subject.

The control device 16 extracts the head-center-of-gravity position $g_{head}$ of the subject by using image data from the overhead 3D camera 12 (step S101). The head-center-of-gravity positions, which are successively extracted at regular intervals, will be denoted as follows:

$g_{head}(t1), g_{head}(t2), g_{head}(t3), \ldots,$ where t1, t2, t3, . . . are extraction times.

Next, concurrently with the above operation, the control device 16 extracts the body-center-of-gravity position $g_{fp}$ of the subject by using body pressure data from the body pressure sensor 14 (step S102). The body-center-of-gravity positions, which are successively extracted at regular intervals, will be denoted as follows:

$g_{fp}(t1), g_{fp}(t2), g_{fp}(t3), \ldots.$

Next, the control device 16 calculates the average value Δd of the distance dgg between the head-center-of-gravity position $g_{head}$ and the body-center-of-gravity position $g_{fp}$ during a certain period t (step S103). The distance dgg between the center-of-gravity positions at a certain timing is calculated follows:

$$dgg^2 = |x2-x1|^2 + |y2-y1|^2,$$

where (x1, y1) and (x2, y2) are the coordinates of the head-center-of-gravity position $g_{head}$ and the body-center-of-gravity position $g_{fp}$ with respect to the origin, which is an appropriate reference point on the floor surface.

In order to reduce the computational complexity of calculating the root, the square $dgg^2$ of the distance may be used instead of the distance dgg. The period t, which may be set at any appropriate value, is set at, for example, 10 seconds.

Then, the calculated average value Δd of the distance is compared with a threshold Th1 (step S104). The threshold Th1, which is stored beforehand in the memory of the control device 16, is a statistical value that enables discrimination between a distance corresponding to a normal standing position and a distance corresponding to an abnormal standing position. This comparison is performed because it is possible to evaluate that standing position balance is better as the two center-of-gravity positions are closer to each other, or, in other words, as the distance between the two center-of-gravity positions is smaller.

If the average value Δd of the distance between the center-of-gravity positions is larger than the threshold Th1 (Δd>Th1), the control device 16 determines that there is a possibility of locomotive syndrome, dementia, or accumulated fatigue (step S105). The control device 16 determines that early measures, such as detailed examination, need to be taken (step S106). On the display 18, the control device 16 displays the average value Δd of the distance, a message that there is a possibility of locomotive syndrome or accumulated fatigue, and a message that early measures need to be taken (step S107). At this time, the control device 16 also displays the head-center-of-gravity position $g_{head}$ and the body-center-of-gravity position $g_{fp}$.

The control device 16 performs the Lissajous analysis of time-series data of the body-center-of-gravity position $g_{fp}$:

$g_{fp}(t1), g_{fp}(t2), g_{fp}(t3), \ldots$ (step S108)

In the Lissajous analysis, the control device 16 calculates the second derivative of the body-center-of-gravity position $g_{fp}$ with respect to time:

$\Delta a = d^2 g_{fp}/dt^2$, or, the control device 16 calculates the area Ars of the Lissajous FIG. 100 of the body-center-of-gravity position $g_{fp}$ (step S108). The second derivative Δa represents the acceleration of the body-center-of-gravity position $g_{fp}$. It is medically known that, if a person suffers from locomotive syndrome or dementia, the person is incapable of quickly recovering the correct position if he/she loses standing position balance. Accordingly, if the subject is normal and does not have locomotive syndrome, the change of the center-of-gravity position $g_{fp}$ per unit time is large and the second derivative $\Delta a$ is also large. In other words, if the second derivative $\Delta a$ is small, it is likely that the subject has locomotive syndrome or the like.

The area $\Delta rs$ of the Lissajous figure represents a region in which the center-of-gravity position $g_{fp}$ varies. If a subject has locomotive syndrome or dementia, the subject tends to lack standing position balance considerably. In other words, if the area $\Delta rs$ is large, it is likely that the subject has locomotive syndrome or the like.

After calculating the second derivative $\Delta a$ of the body-center-of-gravity position $g_{fp}$ or the area $\Delta rs$ by performing the Lissajous analysis, the control device 16 compares the calculated $\Delta a$ with a threshold Th2 or compares the calculated $\Delta rs$ with a threshold Th3 (step S109). As with the threshold Th1, the thresholds Th2 and Th3 are statistical values stored beforehand in the memory.

If the second derivative $\Delta a$ is smaller than the threshold Th2 ($\Delta a$<Th2) or if the area $\Delta rs$ is larger than the threshold Th3 ($\Delta rs$>Th3), it is determined that there is a possibility of locomotive syndrome or the like (step S105), and a message stating the possibility is displayed on the display 18 together with $\Delta a$ or $\Delta rs$ (steps S107 and S108).

If $\Delta d$ is smaller than or equal to the threshold Th1, and, if $\Delta a$ is larger than or equal to the threshold Th2 or if $\Delta rs$ is smaller than or equal to the threshold Th3, the control device 16 determines that standing position balance is maintained and there is no problem (step S110), and displays the result on the display 18 (step S107).

As is clear from the flowchart of FIG. 5, in the present exemplary embodiment, if at least one of $\Delta d$, $\Delta a$, and $\Delta rs$ is abnormal when compared with a corresponding threshold, it is determined that there is a possibility of locomotive syndrome or the like. That is, even if $\Delta d$ is smaller than or equal to the threshold Th1, if $\Delta a$ is smaller than the threshold Th2, it is determined that there is a possibility of locomotive syndrome or the like. Even if $\Delta a$ is larger than or equal to the threshold Th2, if $\Delta d$ is larger than the threshold Th1, it is determined that there is a possibility of locomotive syndrome or the like.

In the flowchart of FIG. 5, $\Delta a$ or $\Delta rs$ is compared with the threshold Th2 or Th3 in step S109. Alternatively, both $\Delta a$ and $\Delta rs$ may be analyzed in step S108, and $\Delta a$ may be compared with the threshold Th2 and $\Delta rs$ may be compared with the threshold Th3 in step S109. Also in this case, if at least one of $\Delta a$ and $\Delta rs$ is abnormal when compared with the threshold, it is determined that there is a possibility of locomotive syndrome or the like.

In the flowchart of FIG. 5, the second derivative $\Delta a$ or $\Delta rs$ is calculated by performing the Lissajous analysis of the body-center-of-gravity position $g_{fp}$. In the same way, the second derivative or the area may be calculated by performing the Lissajous analysis of the head-center-of-gravity position $g_{head}$, and the second derivative or the area may be respectively compared with the thresholds.

Evaluation parameters used in the flowchart of FIG. 5 are as follows.

distance between center-of-gravity positions: dgg or dgg$^2$
second derivative of body-center-of-gravity position $g_{fp}$: $\Delta a$
Lissajous area of body-center-of-gravity position $g_{fp}$: $\Delta rs$
second derivative of head-center-of-gravity position $g_{head}$: $\Delta b$
Lissajous area of head-center-of-gravity position $g_{head}$: $\Delta rsb$ All of these evaluation parameters may be respectively compared with the thresholds, or some of the evaluation parameters may be selectively compared with the thresholds.

Next, each of the evaluation parameters will be described.
Head-Center-of-Gravity Position $g_{head}$ FIGS. 6A to 6C schematically illustrate the processing performed in step S101 of FIG. 5, that is, the processing for extracting the head-center-of-gravity position $g_{head}$.

Figure 6A:
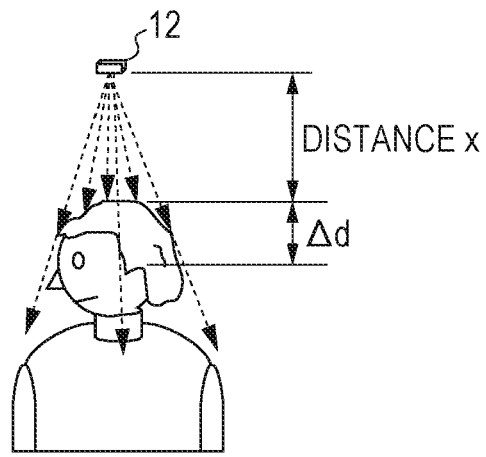
FIGS. 6A to 6C illustrate a method of calculating the head-center-of-gravity position.

FIG. 6A is a front view showing a state in which the overhead 3D camera 12 captures an image of a subject. For convenience of drawing, the subject is facing sideways in FIG. 6A. In practice, however, the image is captured when the subject is facing forward. As described above, the overhead 3D camera 12 detects the distances from the overhead 3D camera 12 to parts of the head of the subject. FIG. 6A shows the shortest distance x and a distance that is further away from the overhead 3D camera by a depth $\Delta d$ in addition to the distance x, which are distances obtained from images captured by the overhead 3D camera 12 (images for the right eye and images for the left eye). This $\Delta d$ approximately corresponds to the upper end of an ear of the subject.

Figure 6B:
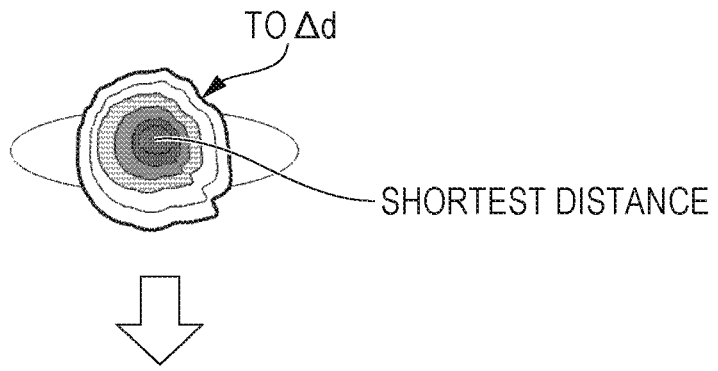

FIG. 6B illustrates contour lines from the shortest distance x to the depth $\Delta d$, which are the distances obtained from the images captured by the overhead 3D camera 12. The head-center-of-gravity position $g_{head}$ is calculated on the basis of image data in the distance range of x to (x+$\Delta d$).

Figure 6C:
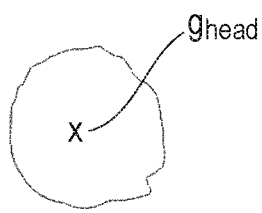

FIG. 6C shows the outline of image data in the distance range of x to (x+$\Delta d$) shown in FIG. 6B and the head-center-of-gravity position $g_{head}$, which is calculated as the areal center of this region.

When calculating the head-center-of-gravity position $g_{head}$ from the overhead image, if the hairstyle of the subject may influence the calculation, the influence of the hairstyle may be reduced by placing a tightly fitting cap on the head of the subject. Alternatively, a front sub-camera or a side sub-camera, which is disposed at a certain position relative to the overhead 3D camera 12, may be used; the influence of the hairstyle on the overhead image may be reduced by using image data captured by using the sub-cameras; and the center-of-gravity position $g_{head}$ may be calculated.

Figure 7:
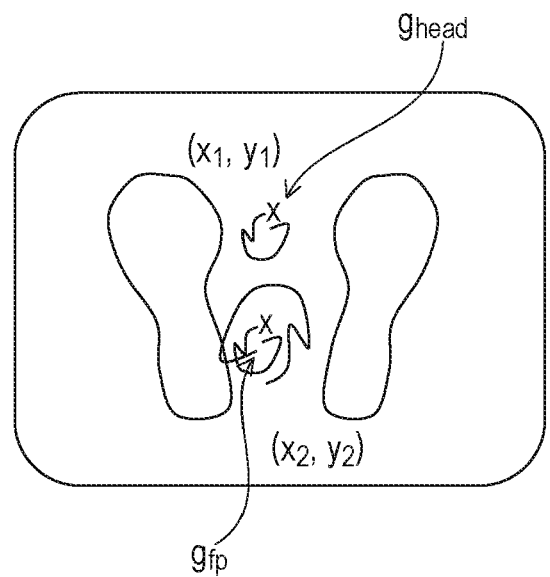
FIG. 7 is a diagram illustrating the distance between the head-center-of-gravity position and the body-center-of-gravity position and Lissajous figures.

FIG. 7 shows the relationship between the head-center-of-gravity position $g_{head}$ and the body-center-of-gravity position $g_{fp}$. The distance between the two center-of-gravity positions is calculated as follows:

$$dgg^2 = |x2-x1|^2 + |y2-y1|^2,$$

where $g_{head}$(x1, y1) and $g_{fp}$(x2, y2) are the two center-of-gravity positions. FIG. 7 also shows the variations of the center-of-gravity positions with time, that is, the Lissajous figures.

Figure 8:
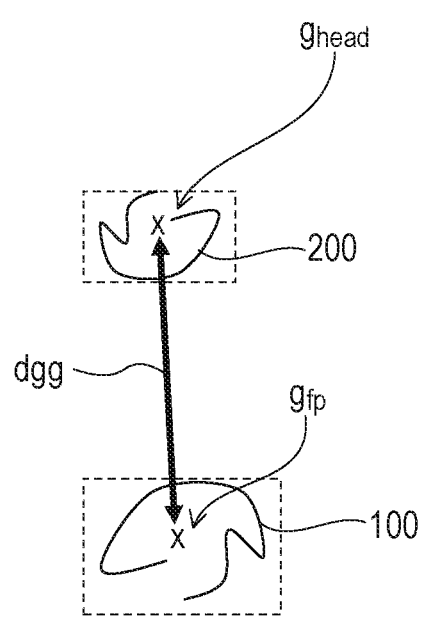
FIG. 8 is another diagram illustrating the distance between the head-center-of-gravity position and the body-center-of-gravity position and Lissajous figures.

FIG. 8 shows the two center-of-gravity positions $g_{head}$ and $g_{fp}$, the distance dgg between the two center-of-gravity positions, the Lissajous figures, and the areas of the Lissajous figures, which are parameters used to evaluate standing position balance in the present exemplary embodiment. Referring to FIG. 8, the Lissajous FIG. 200 is the Lissajous figure of the head-center-of-gravity position $g_{head}$. The area of the Lissajous FIG. 100 or the area of the Lissajous FIG. 200 is defined as the area of the circumscribed rectangle of the Lissajous figure. Needless to say, this is an example, and the area may be defined as the area of the circumscribed circle of the Lissajous figure. If dgg is large, if the variation of $g_{head}$ or $g_{fp}$ with time is small and movement is slow, or if the area of the Lissajous figure of $g_{head}$ or $g_{fp}$ is large, it is determined that there is a possibility of locomotive syndrome or the like.

Second Derivative of Center-of-Gravity Position

Figure 9A:
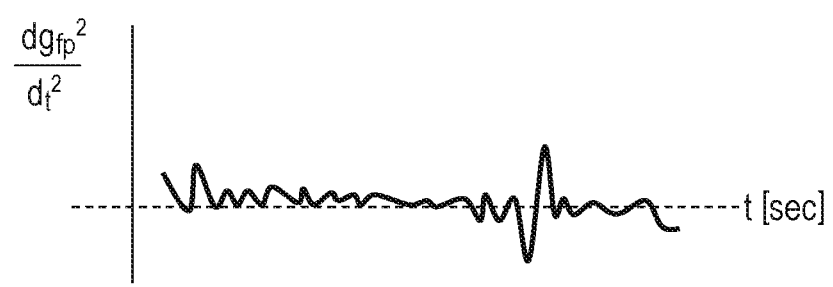
FIGS. 9A and 9B are waveform charts of the second derivative of the body-center-of-gravity position.
Figure 9B:
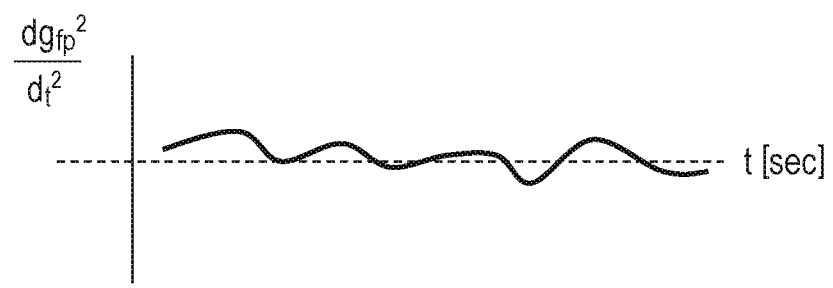

FIGS. 9A and 9B illustrate the change of the second derivative of the body center-of-gravity position $g_{fp}$. FIG. 9A shows the second derivative of a normal subject, and FIG. 9B shows the second derivative of a subject who is likely to have locomotive syndrome. The second derivative of the normal subject is large, because the subject frequently moves to correct the position so as to maintain standing position balance. In contrast, the second derivative of a subject who is like to have locomotive syndrome is small, because the subject delays in maintaining standing position balance and is slow in movement. Accordingly, the second derivative is compared with the threshold, and, if the second derivative is smaller than or equal to the threshold, it is possible to determine that the movement for correcting the center of gravity is slow, that is, the subject may have locomotive syndrome.

Distance Between Center-of-Gravity Positions

Figure 10:
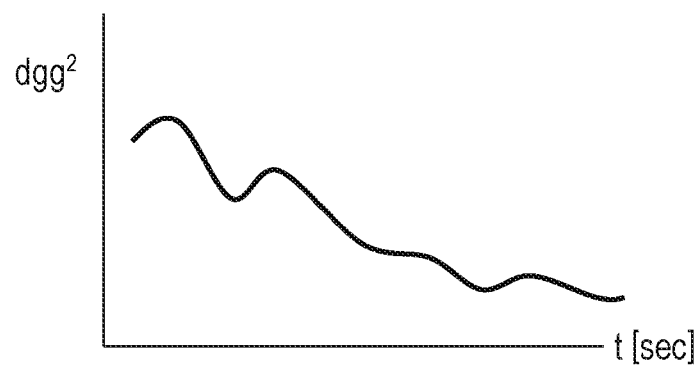
FIG. 10 illustrates the change of the distance between the center-of-gravity positions.

FIG. 10 illustrates the change of the distance dgg between the center-of-gravity positions. In order to simplify the calculation, the change of $dgg^2$ is shown in FIG. 10. The distance dgg between the center-of-gravity positions, for example, gradually decreases with time and approaches the neighborhood of a certain value. By calculating the average value of the distance during a certain period and by comparing the average value with a threshold, to what extent the head-center-of-gravity position $g_{head}$ and the body-center-of-gravity position $g_{fp}$ are separated from each other is evaluated. If the distance between the positions $g_{head}$ and $g_{fp}$ is larger than or equal to the threshold, it is possible to determine that standing position balance is lost, that is, there is a possibility of locomotive syndrome or the like.

Area of Lissajous Figure

Figure 11:
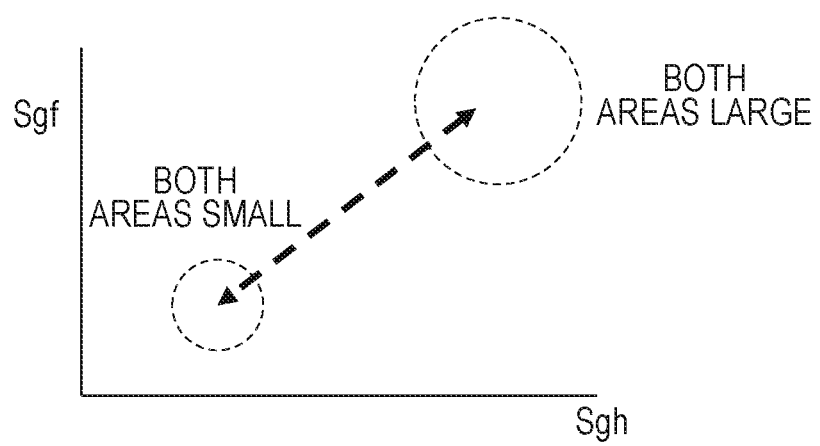
FIG. 11 illustrates the change of the areas of the Lissajous figures of center-of-gravity positions.

FIG. 11 shows the areas of the Lissajous figures. The horizontal axis represents the area Sgh of the Lissajous FIG. 200 of the head-center-of-gravity position $g_{head}$, and the vertical axis represents the area Sgf of the Lissajous FIG. 100 of the body-center-of-gravity position $g_{fp}$. As a point in FIG. 11 moves toward a lower left part of FIG. 11, the areas of both Lissajous figures become smaller; and as a point in FIG. 11 moves toward a right upper part of FIG. 11, the areas of both Lissajous figures become larger. As shown in the flowchart of FIG. 5, it is determined that there is a possibility of locomotive syndrome if the area Sgf (=Δrs) of the Lissajous FIG. 100 of the body-center-of-gravity position $g_{fp}$ is larger than or equal to a threshold. Moreover, it is possible to determine that there is a possibility of locomotive syndrome if the area Sgh of the Lissajous FIG. 200 of the head-center-of-gravity position $g_{head}$ and the area Sgf of the Lissajous FIG. 100 of the body-center-of-gravity position $g_{fp}$ are both larger than or equal to thresholds. It is generally considered that the head-center-of-gravity position $g_{head}$ moves when the body-center-of-gravity position $g_{fp}$ moves. Therefore, if Sgf is larger than or equal to the threshold, it is likely that Sgh is also larger than or equal to the threshold. Accordingly, Sgf may be used as a first evaluation parameter, and Sgh may be used as a second evaluation parameter.

As heretofore described, the present exemplary embodiment includes the overhead 3D camera 12 and the body pressure sensor 14 and evaluates standing position balance by using both the head center-of-gravity position $g_{head}$ and the body center-of-gravity position $g_{fp}$. Therefore, as compared with a case where only the body pressure distribution data from the body pressure sensor 14 is used, it is possible to evaluate standing position balance with higher precision, and thereby it is possible to more easily perform prevention and early detection of locomotive syndrome, dementia, or the like.

With the present exemplary embodiment, it is possible to evaluate the standing position balance of a subject with a simple structure, which includes the overhead 3D camera 12 and the body pressure sensor 14. In the case of capturing the image of the subject by using the overhead 3D camera 12, it is possible not only to extract the head-center-of-gravity position $g_{head}$ but also to evaluate the height of the subject and the body features of the subject, such as stoop, potbelly, and the like.

Figure 12A:
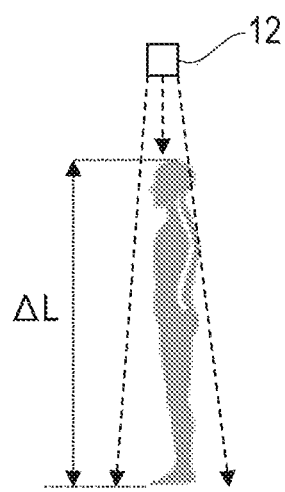
FIGS. 12A and 12B illustrate various body features.
Figure 12B:
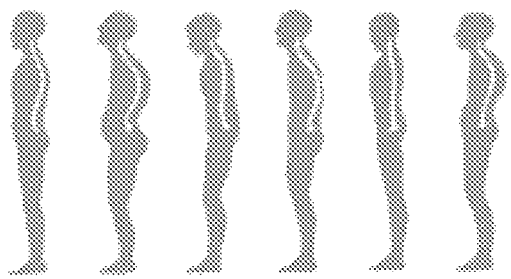

FIG. 12A illustrates how the height ΔL of a subject is measured by calculating the shortest distance x and the longest distance (the distance from the overhead 3D camera 12 to the body pressure sensor 14) from image data obtained by the overhead 3D camera 12. FIG. 12B shows various body features of the subject. It is possible to determine whether or not the subject has stoop, potbelly, or the like by capturing an image of the subject from above the head of the subject by using the overhead 3D camera 12 and by adjusting the depth Δd. In this case, it is considered that the "standing position" and the "standing position balance" are both evaluated.

The condition of a subject may be comprehensively evaluated by using the evaluation result of standing position balance, which is obtained by the standing position evaluation apparatus 10 according to the present exemplary embodiment, together with the measurement results obtained by using other measurement apparatuses. For example, the control device 16 may include a communication device, which sends the evaluation result to a server computer. The server computer (or a cloud computer) collects the results of measurements performed by using other measurement apparatuses, such as a sphygmomanometer, and prevention or early detection is performed by comprehensively evaluating these results.

Collecting data of individuals by performing a medical examination, thorough medical examinations, or the like is known. With the present exemplary embodiment, the result of evaluating standing position balance is added to such data.

In the present exemplary embodiment, as shown in the flowchart of FIG. 5, it is determined that there is a possibility of locomotive syndrome or the like if the relationship between any of the average value Δd of the distance between the center-of-gravity positions, the second derivative Δa of the body-center-of-gravity position $g_{fp}$, and the Lissajous area Δrs of the body-center-of-gravity position $g_{fp}$ and the corresponding threshold is abnormal. Alternatively, it may be the determined that there is a possibility of locomotive syndrome or the like if the relationships between all of the average value Δd of the distance between the center-of-gravity positions, the second derivative Δa, and the area Δrs and the corresponding thresholds are abnormal. As described above, the second derivative Δb of the head-center-of-gravity position $g_{head}$ and the Lissajous area Δrsb (=Sgh) of the head-center-of-gravity position $g_{head}$ may also be used for the determination. Determination algorithms that may be included in the present exemplary embodiment are as follows. Among these, algorithms using both the head-center-of-gravity position $g_{head}$ and the body-center-of-gravity position $g_{fp}$, in particular, algorithms including Δd may be used.

(1) If Δd>threshold, there is a possibility of locomotive syndrome or the like.

(2) If Δa<threshold, there is a possibility of locomotive syndrome or the like.

(3) If Δrs>threshold, there is a possibility of locomotive syndrome or the like.

(4) If Δd>threshold and Δa<threshold, there is a possibility of locomotive syndrome or the like.

(5) If Δd>threshold and Δrs>threshold, there is a possibility of locomotive syndrome or the like.

(6) If Δa<threshold and Δrs>threshold, there is a possibility of locomotive syndrome or the like.

(7) If Δrs>threshold and Δrsb>threshold, there is a possibility of locomotive syndrome or the like.

(8) If Δd>threshold, Δa<threshold, Δrs>threshold, and Δrsb>threshold, there is a possibility of locomotive syndrome or the like.

(9) If Δd>threshold, Δa<threshold, Δb<threshold, Δrs>threshold, and Δrsb>threshold, there is a possibility of locomotive syndrome or the like.

In the present exemplary embodiment, an image of a subject is captured by using the overhead 3D camera 12. Alternatively, the head-center-of-gravity position $g_{head}$ may be calculated by using image data obtained by using a 2D camera, which is different from a 3D camera.

In the present exemplary embodiment, standing position balance is evaluated in a state in which a subject in a standing position in which he/she stands on both feet on the body pressure sensor 14. Alternatively, in a state in which a subject is in a standing position in which he/she stands on one foot on the body pressure sensor 14, the second derivative of the center-of-gravity position $g_{fp}$ or the Lissajous FIG. 100 of the center-of-gravity position $g_{fp}$ may be evaluated. If the subject stands on one foot, it is possible to more clearly detect the change of the second derivative or the change of the area.

As a modification of the present exemplary embodiment, standing position balance may be determined by using the sum of the area of the Lissajous FIG. 200 of the head-center-of-gravity position $g_{head}$ and the area of the Lissajous FIG. 100 of the body-center-of-gravity position $g_{fp}$, that is, the total area. Hereinafter, processing steps performed in this case will be described.

Figure 13:
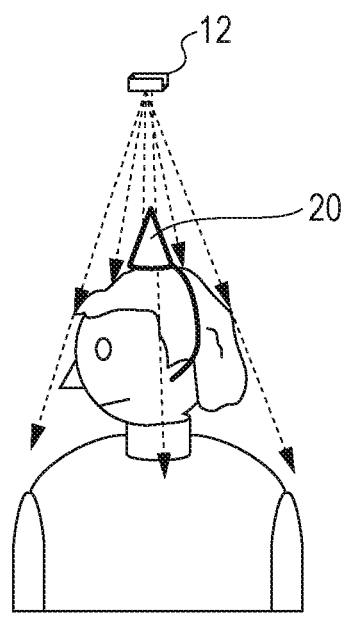
FIG. 13 illustrates a protruding marker according to a modification of the exemplary embodiment, worn on the head of a subject.

FIG. 13 illustrates another method of detecting the head-center-of-gravity position $g_{head}$ that is used to calculate the Lissajous FIG. 200 of the head-center-of-gravity position $g_{head}$. A subject wears a headset having a protruding marker 20, and the position of the apex of the protruding marker 20 is tracked as the head-center-of-gravity position $g_{head}$. The protruding marker 20 is, for example, a white cone-shaped object that reflects infrared radiation and that is recognizable by the overhead 3D camera 12, which is an infrared camera in this case. The overhead 3D camera 12 recognizes the apex of the protruding marker 20 as the shortest-distance point. The shape of the protruding marker 20 need not be a conical shape and may be another shape, such as a triangular-pyramid shape. The protruding marker 20 is also used to evaluate the height of the subject. That is, it is possible to obtain the height data of the subject by measuring the distance between the overhead 3D camera 12 and the apex of the protruding marker 20 by taking the height of the protruding marker 20, which is known beforehand, into consideration. Needless to say, the height of the subject may be measured separately.

Figure 14:
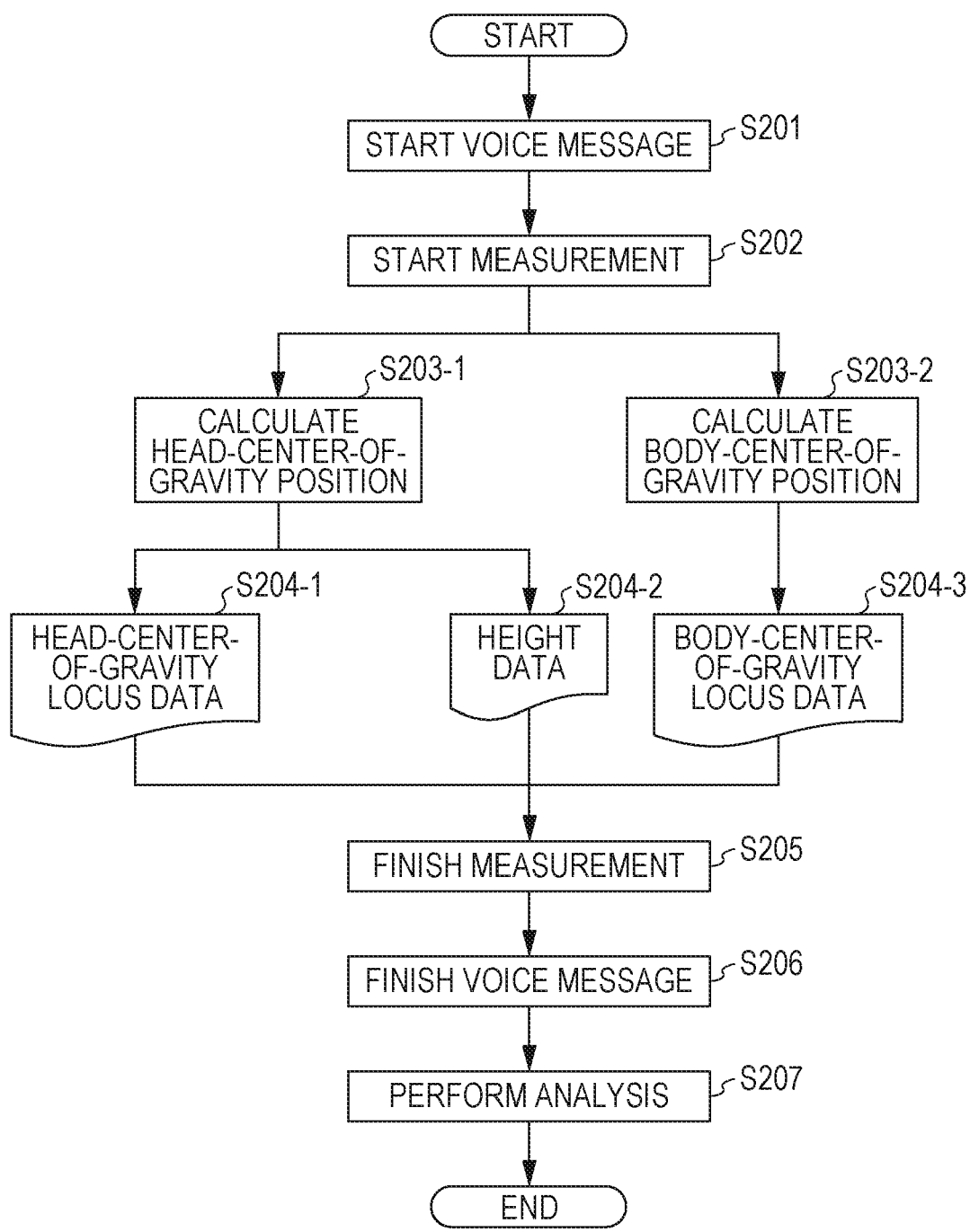
FIG. 14 is a flowchart according to the modification.

FIG. 14 is a flowchart of a process of diagnosing locomotive syndrome by using the total area.

First, a voice message is started in response to an instruction from the control device 16 (step S201). To be specific, a voice message, such as "Start" or "Measurement is started.", is output to inform the subject that measurement will start.

Next, measurement is started (step S202), and the head-center-of-gravity (head-center) position $g_{head}$ and the body-center-of-gravity (body-center) position $g_{fp}$ are calculated (steps S203-1 and S203-2). By calculating the head-center-of-gravity position $g_{head}$ in time series, the locus data of the head-center-of-gravity position $g_{head}$, that is, the Lissajous FIG. 200 is calculated (step S204-1). From the head-center-of-gravity position $g_{head}$, the height data of the subject is calculated (step S204-2). By calculating the body-center-of-gravity position $g_{fp}$ in time series, the locus data of the body-center-of-gravity position $g_{fp}$, that is, the Lissajous FIG. 100 is calculated (step S204-3).

When data has been obtained for a predetermined time, measurement is finished (step S205), and the voice message is finished (step S206). To be specific, a voice message, such as "Finish" or "Measurement has finished.", is output to inform the subject that measurement has finished. Then, the control device 16 analyzes the obtained data. To be specific, the Lissajous FIG. 200 of the head-center-of-gravity position $g_{head}$ and the Lissajous FIG. 100 of the body-center-of-gravity position $g_{fp}$ are mapped onto the same reference plane, the area of a bounding region that bounds the two mapped Lissajous figures is calculated as the total area, and a possibility of locomotive syndrome is evaluated by using the calculated total area (step S207). The Lissajous figure of the head-center-of-gravity position $g_{head}$ is obtained by using the overhead 3D camera 12 and the Lissajous figure of the body-center-of-gravity position $g_{fp}$ is obtained by using the body pressure sensor 14. Therefore, in order to use the two Lissajous figures together, it is necessary to map the two Lissajous figures onto the same reference plane. When mapping the Lissajous figures, it is necessary to perform conversion processing of various types. The conversion processing will be described below.

Figure 15:
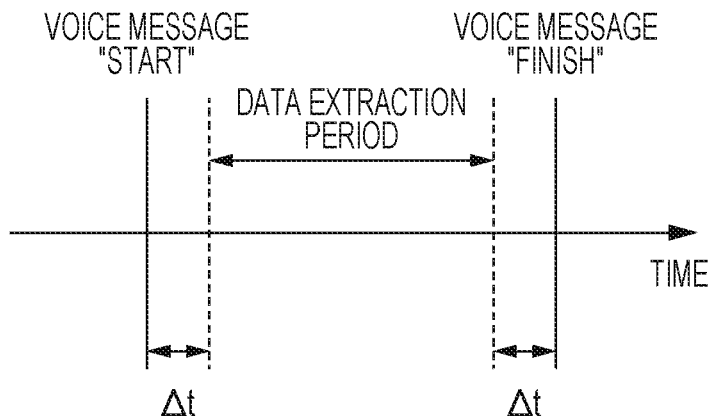
FIG. 15 a diagram showing a data extraction period.

FIG. 15 schematically illustrates the timing of obtaining data. Data is obtained during a period from the time when voice message is started in step S201 to the time when voice message is finished in step S206. However, data is not obtained for a predetermined time Δt after the time when voice message is started and for the predetermined time Δt before the time when the voice message is finished. This is in order to exclude a moment immediately after the voice message is started and a moment immediately before the voice message is finished from the period for obtaining data, because, the standing position of the subject is not stable in these moments and the reliability of data obtained in these moments may be low. The predetermined time Δt, which is not particularly limited, may be, for example, about 2 or 3 seconds, and the period for obtaining data may be, for example, 30 seconds.

Figure 16:
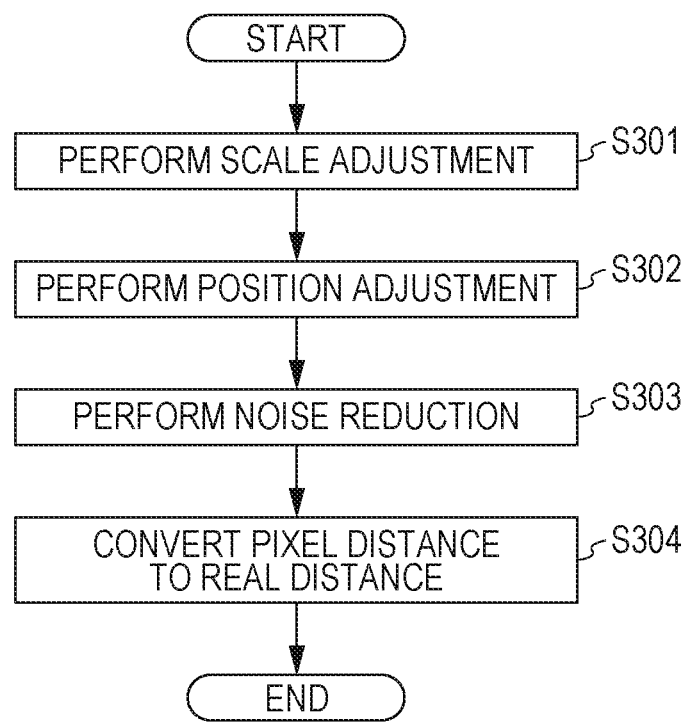
FIG. 16 is a detailed flowchart of analysis processing.

FIG. 16 illustrates the details of analysis processing performed in step S207.

First, scale adjustment is performed (step S301). In this step, to take the height of the subject into consideration, a conversion factor k, which is used for conversion to a reference height, is calculated.

Second, position adjustment is performed (step S302). In this step, if the position of the overhead 3D camera 12 and the position of the center of the body pressure sensor 14 are displaced from each other, these positions are made to coincide. In order to map the Lissajous FIG. 100 and the Lissajous FIG. 200 onto the same reference plane and to evaluate the standing position balance by using the total area, it is necessary that the position of the overhead 3D camera 12 and the position of the center of the body pressure sensor 14 precisely coincide. When the amount of displacement between the overhead 3D camera 12 and the body pressure sensor 14 is represented by (mx,my), the amount of displacement is corrected by using (mx,my) as an offset.

Third, noise reduction is performed (step S303). When tracking the shortest-distance point of the protruding marker 20, a phenomenon in which a tracked point is momentarily skipped may occur. In this step, a case where such a sudden change has occurred is removed as noise. To be specific, when Th represents a threshold, $L_x$ represents a data value obtained at a certain time, and $L_{x-1}$ represents a data value obtained at a timing immediately before the certain time, if $L_x-L_{x-1}$ exceeds the threshold Th, noise is removed by replacing $L_x$ with $L_{x-1}$.

Fourth, actual-distance conversion is performed (step S304). In this step, a pixel distance obtained by the overhead 3D camera 12 is converted to an actual distance. For example, 12 pixels of the overhead 3D camera 12 is converted to 1 cm.

Figure 17:
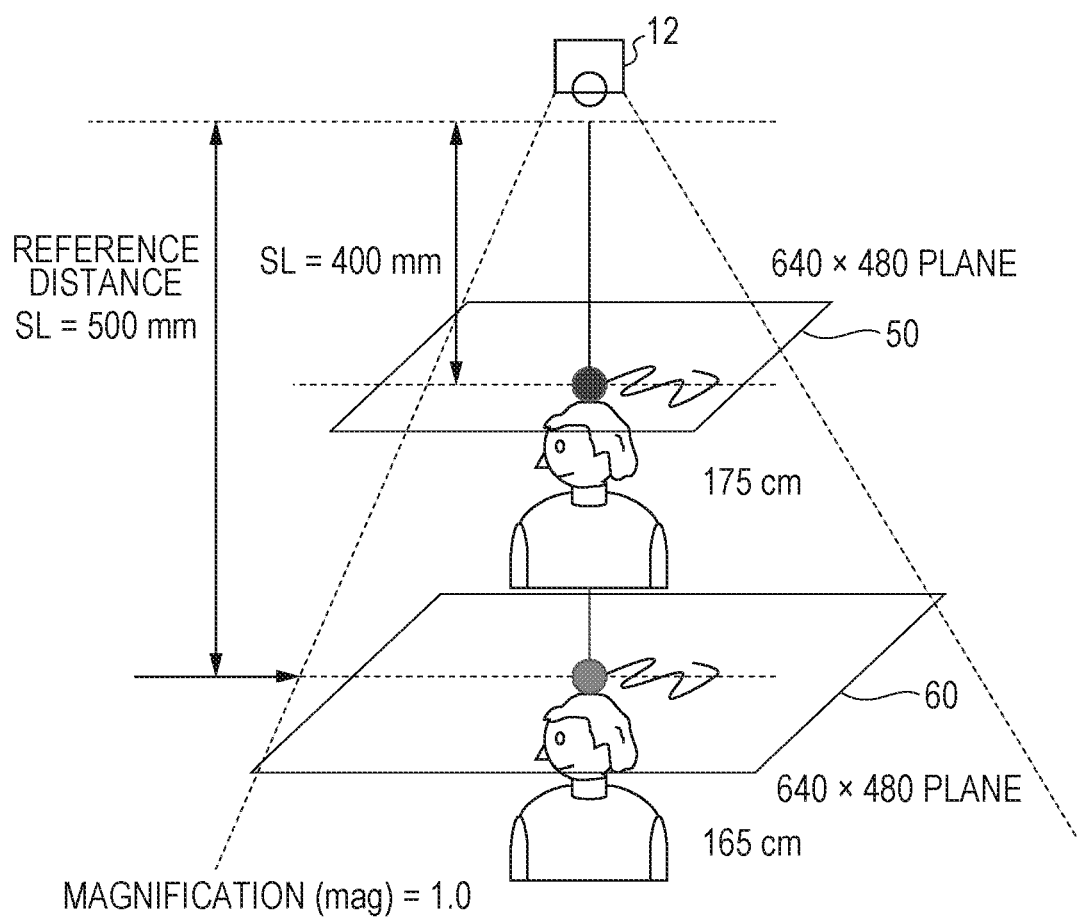
FIG. 17 is a first schematic view of scale adjustment.

FIG. 17 schematically illustrates scale adjustment performed in step S301. This is a case where the reference height is 165 cm and the height of a subject is 175 cm. When the distance SL (reference distance) between the overhead 3D camera 12 and a subject whose height is the reference height is 500 mm, the distance SL between the overhead 3D camera 12 and the subject whose height is 175 cm is 400 mm. The size of the Lissajous FIG. 200 differs in accordance with the distance from the overhead 3D camera 12, even if the actual movement of the subject is the same. That is, the size of the Lissajous FIG. 200 increases as the distance from the overhead 3D camera decreases, even if the movement amount is the same. Accordingly, it is necessary to convert the Lissajous FIG. 200 of the subject whose height is 175 cm in an evaluation plane 50 to the Lissajous FIG. 200 in an evaluation plane 60, which is an evaluation plane for the subject whose height is the reference height of 165 cm.

Figure 18:
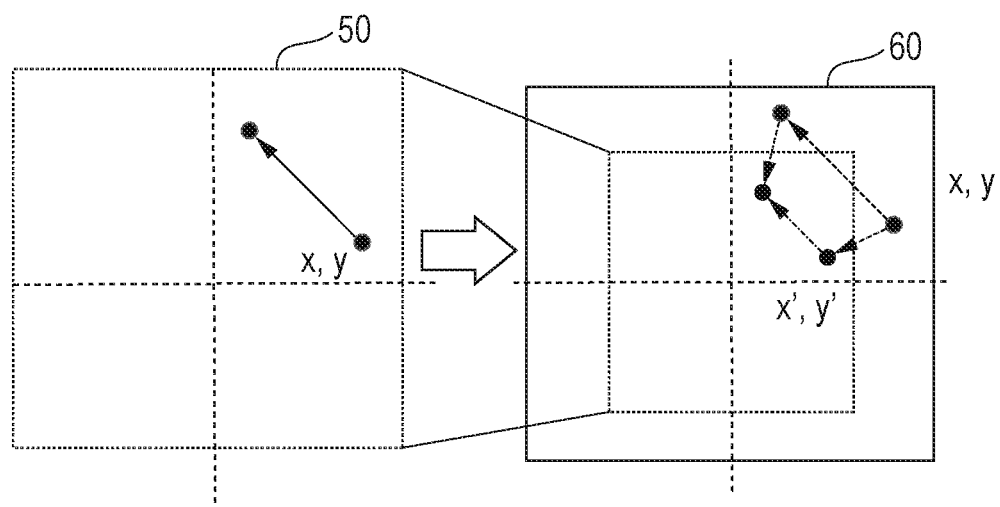
FIG. 18 is a second schematic view of scale adjustment.

FIG. 18 illustrates conversion from the evaluation plane 50 to the evaluation plane 60. The conversion factor k=(distance from the overhead 3D camera)/(reference distance). Therefore, in the case of FIG. 17, k=400/500=0.8. Accordingly, when the coordinates of the origin (the lower left corner) of the evaluation plane 50 are (0,0), the coordinates of the upper right corner are (640,480), and the coordinates at the center are (320,240), coordinates (x,y) in the evaluation plane 50 are converted to coordinates (x', y') in the evaluation plane 60 as follows: x'=320+k(x−320)=320+0.8(x−320) and y'=240+k(y−240)=240+0.8(y−240). When the aforementioned displacement (mx,my) is taken into consideration and the displacement is corrected, the coordinates (x',y') are calculated as follows: x'=320+0.8(x−320)+mx and y'=240+0.8(y−240)+my.

By performing the processing described above, the Lissajous FIG. 200 of the head-center-of-gravity position $g_{head}$ and the Lissajous FIG. 100 of the body-center-of-gravity position $g_{fp}$, which are obtained for a subject having any height, are mapped onto the same reference plane, and the total area of the two Lissajous FIGS. 100 and 200 is calculated.

Figure 19:
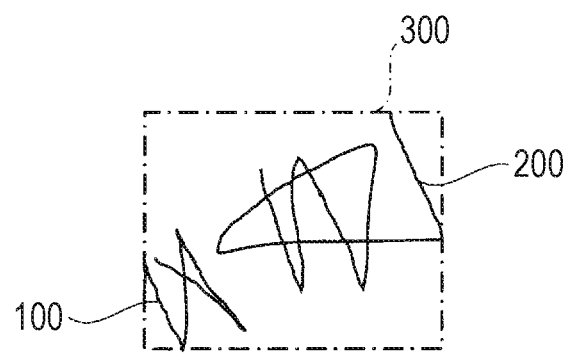
FIG. 19 illustrates a bounding region that bounds two Lissajous figures.

FIG. 19 schematically illustrates the total area of the two Lissajous FIGS. 100 and 200 mapped onto the same plane. The total area is defined as the area of a bounding region (in FIG. 19, a rectangular region 300) that bounds the Lissajous FIGS. 100 and 200 mapped onto the same reference plane. The area of the rectangular region 300 decreases as the Lissajous FIGS. 100 and 200 overlap each other to a larger extent and as the area of each of the Lissajous FIGS. 100 and 200 decreases. The area of the rectangular region 300 increases as the Lissajous FIGS. 100 and 200 become separated from each other and as the area of each of the Lissajous FIGS. 100 and 200 increases. The smaller the total area, the better the standing position balance and the lower the probability of locomotive syndrome. By comparing the total area with a threshold, when the total area exceeds the threshold, it is possible to evaluate that there is a possibility of locomotive syndrome. The threshold may be fixed, or may be variable in accordance the age, the sex, and the like of a subject.

Figure 20A:
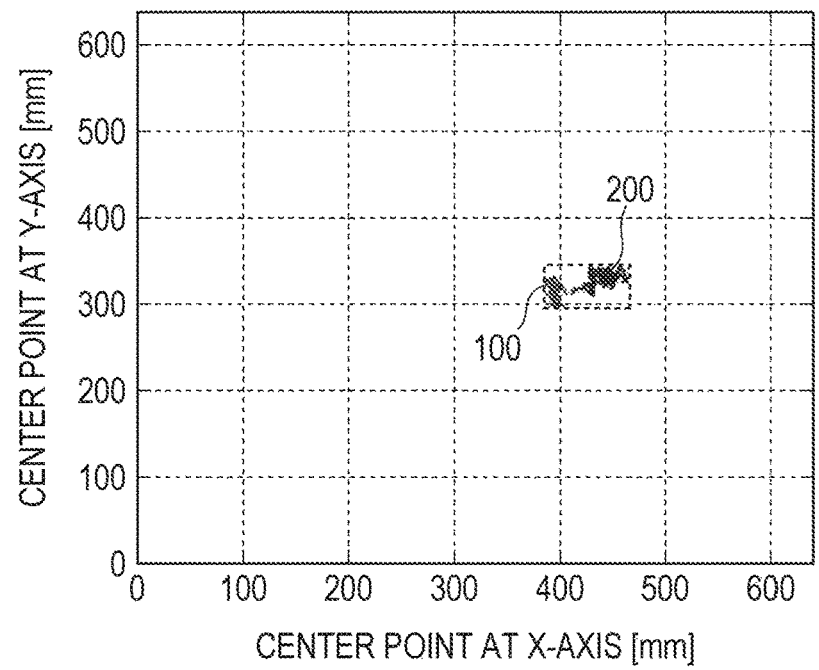
FIGS. 20A and 20B illustrate results of measuring the total area.
Figure 20B:
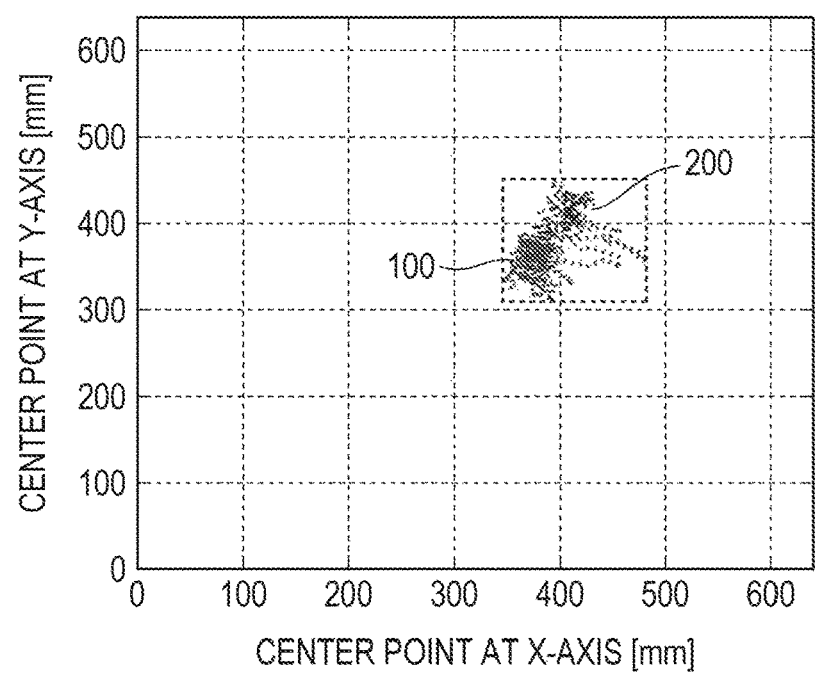

FIGS. 20A and 20B illustrate examples of the total area of a subject A (a man in his fifties) and the total area of a subject B (a woman in her seventies), when each of them stands on one foot for 30 seconds. Because the areas of the Lissajous FIGS. 100 and 200 of the subject A are small, the total area of the subject A is relatively small. On the other hand, because the Lissajous FIGS. 100 and 200 of the subject B are separated from each other and the areas of the Lissajous FIGS. 100 and 200 are large, the total area of the subject B is relatively large. The standing position balance of the subject A is good, whereas the standing position balance of the subject B is bad, and the subject B is suspected to have locomotive syndrome. By plotting the total area in time series, it is easy to know when the standing position balance was lost. If a subject is not capable of standing on one foot for the data extraction period, the motor function of the subject may be evaluated by using the time (seconds) for which the subject was capable of standing on one foot.

Figure 21:
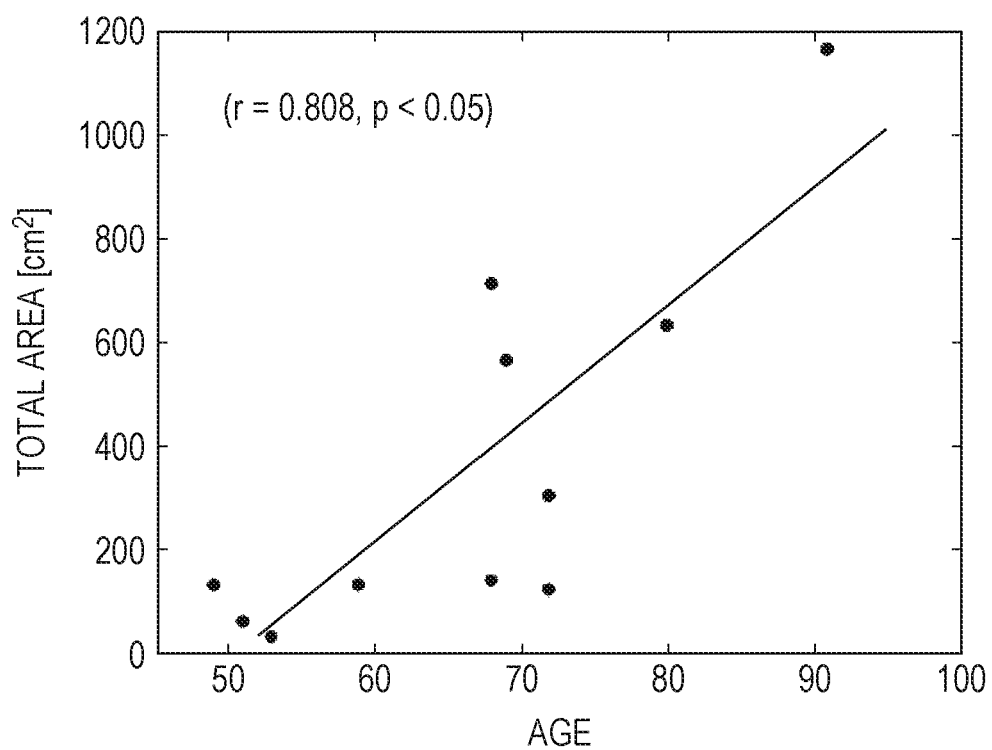
FIG. 21 illustrates the relationship between the age and the total area.

FIG. 21 is a graph plotting the relationship between the age and the total area measured for plural subjects. In FIG. 21, the horizontal axis represents the age and the vertical axis represents the total area (cm$^2$). The correlation coefficient r between the age and the total area is 0.808, which shows a high positive correlation. In general, the motor function decreases with age. Therefore, the total area may be used as an indicator for quantitatively evaluating decrease of the motor function and the degree of locomotive syndrome. Because the total area is correlated not only with the motor function but also with the brain adjustment function, the total area may be used also for early detection of brain dysfunctions, such as dementia and Alzheimer's disease, and for monitoring of the effect of rehabilitation.

In the present modification, the bonding region that bounds the Lissajous FIGS. 100 and 200 is a rectangular region as illustrated in FIG. 19 and other figures. However, the bounding region may be a circular region and the area of the circular region may be used as the total area.

Because the total area in the present modification is the area of the bounding region that bounds the two Lissajous FIGS. 100 and 200 mapped onto the same reference plane, needless to say, the total area is not simply the sum of the area of the Lissajous FIG. 100 and the area of the Lissajous FIG. 200.

In addition to the total area, the total length of the loci of the Lissajous FIGS. 100 and 200, deviation from the average position, and the speed of fluctuations of the loci may be used in combination to evaluate the standing position balance of a subject.

In the present modification, standing position balance may be evaluated by using both of the result of measurement performed when a subject stands on both feet and the result of measurement performed when the subject stands on one foot. In general, it is easier to keep balance on both feet than on one foot. Therefore, if the total area exceeds a threshold when the subject stands on both feet, the probability of locomotive syndrome is particularly high. Alternatively, measurement for one-foot stand may be performed in normal cases, and measurement for both-feet stand may be performed in special cases. As user interface (UI), the display 18 may display a select button for selecting between both-feet stand and one-foot stand, in addition to a start button, a stop button, and a measurement result display button.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A standing position evaluation apparatus comprising:
a center-of-gravity position detection unit configured to detect a head-center-of-gravity position that is a position of a center of gravity of a head of a subject in a standing position projected onto a floor surface and a body-center-of-gravity position that is a position of a center of gravity of a body of the subject in the standing position projected onto the floor surface; and
an evaluation unit configured to evaluate a standing position balance of the subject by using the detected head-center-of-gravity position and the detected body-center-of-gravity position, and
wherein the evaluation unit is configured to, in response to a difference between the detected head-center-of-gravity position and the detected body-center-of-gravity position being larger than a threshold, notify that the evaluated standing position balance indicates a possibility of disease.

2. The standing position evaluation apparatus according to claim 1,
wherein the evaluation unit is configured to evaluate the standing position balance by comparing a distance between the head-center-of-gravity position and the body-center-of-gravity position with a threshold.

3. The standing position evaluation apparatus according to claim 2,
wherein the evaluation unit is configured to evaluate the standing position balance by comparing a second derivative of at least one of the head-center-of-gravity position and the body-center-of-gravity position with respect to time with a threshold.

4. The standing position evaluation apparatus according to claim 2,
wherein the evaluation unit is configured to evaluate the standing position balance by comparing an area of a Lissajous figure of at least one of the head-center-of-gravity position and the body-center-of-gravity position with a threshold.

5. The standing position evaluation apparatus according to claim 1,
wherein the evaluation unit is configured to evaluate the standing position balance by comparing a second derivative of at least one of the head-center-of-gravity position and the body-center-of-gravity position with respect to time with a threshold.

6. The standing position evaluation apparatus according to claim 1,
wherein the evaluation unit is configured to the standing position balance by comparing an area of a Lissajous figure of at least one of the head-center-of-gravity position and the body-center-of-gravity position with a threshold.

7. The standing position evaluation apparatus according to claim 1,
wherein the center-of-gravity position detection unit is configured to detect the head-center-of-gravity position from an image of the head captured by an image capturing unit and calculates the body-center-of-gravity position from information about a pressure measured by a pressure measurement unit.

8. The standing position evaluation apparatus according to claim 7,
wherein the image capturing unit comprises a 3D camera.

9. The standing position evaluation apparatus according to claim 8,
wherein the evaluation unit is configured to evaluate the standing position balance by comparing, with a threshold, an area of a bounding region that bounds a Lissajous figure of the head-center-of-gravity position and a Lissajous figure of the body-center-of-gravity position that are mapped onto the same reference plane.

10. The standing position evaluation apparatus according to claim 9,
wherein the evaluation unit is configured to perform correction by using a height of the subject when mapping the Lissajous figure of the head-center-of-gravity position and the Lissajous figure of the body-center-of-gravity position onto the same reference plane.

11. The standing position evaluation apparatus according to claim 10,
wherein the center-of-gravity position detection unit is configured to detect an apex of a protruding marker, which is worn on the head of the subject, to detect the head-center-of-gravity position.

12. The standing position evaluation apparatus according to claim 9,
wherein the evaluation unit is configured to perform correction by using a displacement between a position of the 3D camera and the position of the pressure measurement unit when mapping the Lissajous figure of the head-center-of-gravity position and the Lissajous figure of the body-center-of-gravity position onto the same reference plane.

13. The standing position evaluation apparatus according to claim 12,
wherein the center-of-gravity position detection unit is configured to detect an apex of a protruding marker, which is worn on the head of the subject, to detect the head-center-of-gravity position.

14. The standing position evaluation apparatus according to claim 9,
wherein the center-of-gravity position detection unit is configured to detect an apex of a protruding marker, which is worn on the head of the subject, to detect the head-center-of-gravity position.

15. The standing position evaluation apparatus according to claim 8,
wherein the center-of-gravity position detection unit is configured to detect an apex of a protruding marker, which is worn on the head of the subject, to detect the head-center-of-gravity position.

16. The standing position evaluation apparatus according to claim 1, wherein the evaluation unit is configured to, in response to the difference between the detected head-center-of-gravity position and the detected body-center-of-gravity position being larger than the threshold, notify that the evaluated standing position balance indicates a possibility of at least one of locomotive syndrome, dementia, and accumulated fatigue.

17. A standing position evaluation method comprising:
  detecting a head-center-of-gravity position that is a position of a center of gravity of a head of a subject in a standing position projected onto a floor surface and a body-center-of-gravity position that is a position of a center of gravity of a body of the subject in a standing position projected onto the floor surface; and
  evaluating a standing position balance of the subject by using the detected head-center-of-gravity position and the detected body-center-of-gravity position,
  wherein the evaluating comprises, in response to a difference between the detected head-center-of-gravity position and the detected body-center-of-gravity position being larger than a threshold, notifying that the evaluated standing position balance indicates a possibility of disease.

18. A non-transitory computer readable medium storing a program causing a computer to execute a process for evaluating a standing position, the process comprising:
  detecting a head-center-of-gravity position that is a position of a center of gravity of a head of a subject in a standing position projected onto a floor surface and a body-center-of-gravity position that is a position of a center of gravity of a body of the subject in the standing position projected onto the floor surface; and
  evaluating a standing position balance of the subject by using the detected head-center-of-gravity position and the detected body-center-of-gravity position,
  wherein the evaluating comprises, in response to a difference between the detected head-center-of-gravity position and the detected body-center-of-gravity position, being larger than a threshold notifying that the evaluated standing position balance indicates a possibility of disease.

* * * * *